Patented Sept. 11, 1945

2,384,543

UNITED STATES PATENT OFFICE 2,384,543

SYNTHETIC RUBBERLIKE MATERIALS

Charles F. Fryling, Silver Lake, Ohio, assignor to The B. F. Goodrich Company, New York, N. Y., a corporation of New York No Drawing. Application May 10, 1940, Serial No. 334,381

11 Claims. (Cl. 260—84.5)

This invention relates to new and improved synthetic rubber-like materials and to a method of preparing the same. More particularly, this invention relates to the products resulting from the polymerization of mixtures containing a diene hydrocarbon and an acrylic nitrile together with small amounts of an aryl olefin, and to a process for carrying out the polymerization.

The early discovery that conjugated diene hydrocarbons such as butadiene, isoprene or dimethyl butadiene are capable of being polymerized to elastic rubber-like materials has formed the basis of modern synthetic rubber production. However, it is now well recognized that many polymerizable substances which do not alone form rubber-like polymers may be polymerized in the presence of a diene hydrocarbon to give rubber-like products remarkably different from and superior to simple diene polymers. The products thus formed also differ from those obtained by mechanically mixing polymerized dienes with other polymers and derive their unusual properties from a chemical combination of the molecules of the polymerizable compounds in the structure of the polymer. These products are termed "copolymers" or "interpolymers" and the process of their production is referred to as "copolymerization" or "interpolymerization." Certain of these copolymers have already attained commercial importance as synthetic rubbers.

One of the most important of these rubber-like copolymers is that resulting from the polymerization of a mixture of a butadiene hydrocarbon and an acrylic nitrile, the mixture containing over 60% by weight of the butadiene hydrocarbon. This copolymer is superior to natural rubber in regard to its resistance to swelling by oils, resistance to aging and mechanical strength. However, the copolymer is more difficult to process than is natural rubber. It is only slightly thermoplastic and must be masticated on a cold mill. The resulting sheet is less plastic and less tacky than one of natural rubber. As a result more power is required properly to disperse pigments therein than in the case of natural rubber.

Another synthetic rubber prepared by the copolymerization of not more than 40% by weight of styrene or vinyl naphthalene with a butadiene hydrocarbon is more thermoplastic and more easily milled than is the butadiene acrylic nitrile copolymer but its mechanical strength is somewhat less and its oil resistance is much poorer. It has previously been believed, therefore, that the incorporation of styrene or another aryl olefin into a butadiene acrylic nitrile polymerizate would result in the production of a material slightly more plastic but having less desirable physical properties and oil resistance than the butadiene acrylic nitrile copolymer.

I have now discovered, however, that the inclusion of limited amounts of an aryl olefin in a mixture already containing a diene hydrocarbon and an acrylic nitrile produces, when polymerized, a synthetic rubber which not only is more plastic but also is mechanically stronger and more resistant to oils and chemicals than the butadiene acrylic nitrile copolymer containing no aryl olefin. Moreover, the presence of small amounts of aryl olefin also permits the employment of smaller proportions of the diene while still obtaining good rubber-like properties in the polymer.

The polymerizable mixtures which yield the improved synthetic rubber-like materials of this invention will thus contain at least three monomers, namely: (1) a diene hydrocarbon such as butadiene, isoprene, dimethyl butadiene or, in general, a compound of the formula

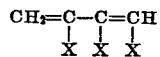

wherein X stands for a hydrogen atom or a methyl group, (2) an acrylic nitrile of the general formula

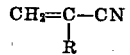

wherein R is hydrogen or alkyl, such as acrylonitrile, methacrylonitrile or ethacrylonitrile, and (3) an aryl olefin such as styrene or vinyl naphthalene or, in general, a compound of the formula

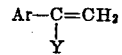

wherein Ar represents an aromatic hydrocarbon radical and Y is hydrogen or alkyl. The unexpected improvement in properties of synthetic rubbers produced from such mixtures is brought about when the mixture contains from about 1 to 10% by weight of the aryl olefin. Employing the aryl olefin in amounts substantially greater than 10% by weight of the mixture results in lowered mechanical properties of the polymer and, accordingly, such polymers are not included in this invention. In order to obtain rubber-like properties such as elasticity and vulcanizability it is also necessary that the mixture contain at least 40% by weight of the diene hydrocarbon. Suitable proportions of the monomers are therefore from 40 to 80% by weight of the diene hydrocarbon, from 20 to 50% by weight of the acrylic nitrile and about 1 to 10% by weight of the aryl olefin.

Any suitable method or process may be employed for effecting polymerization of the mixtures of monomers. Thus, polymerization may be carried out in a homogenous system by the application of such means as heat, actinic light or pressure to the mixture either with or without the presence of a solvent and/or a polymerization catalyst. It is at present preferred, however, to carry out the polymerization in water emulsion in the presence of an emulsifying agent and, preferably but not essentially, a polymerization catalyst. A number of emulsifying agents may be used for this purpose among which are fatty acid soaps such as sodium myristate or sodium palmitate, hymolal sulfates or sulfonates such as sodium lauryl sulfate, aromatic sulfonic acids or derivatives thereof such as sodium isobutyl naphthalene sulfonate, salts of high molecular weight organic bases such as the hydrochloride of diethylaminoethyloleylamide, and others. A very effective emulsifying agent consists of a 2–3% water emulsion of a fatty acid, such as myristic or palmitic acid, which has been 80 to 95% neutralized with alkali.

As catalysts for the emulsion polymerization may be mentioned such compounds as hydrogen peroxide, potassium persulfate, sodium perborate, benzoyl peroxide, styrene oxide, diazoaminobenzene, dipotassium diazomethanedisulfonate, sulfur dioxide, sodium hydrosulfite and many others. When hydrogen peroxide is used as the catalyst, other compounds which are peroxide activators may be used therewith, if desired, among which are sodium pyrophosphate, sodium oxalate, potassium fluoride, urea, glycine, alanine and the like. Other materials known to direct the course of the polymerization or to modify the properties of the polymers obtained also may be included in the mixture to be polymerized.

When polymerization is effected in water emulsion it is desirable to carry out the polymerization at temperatures between 20° and 70° C., and to agitate the emulsion continuously. After completion of the polymerization, which usually requires from 1 to 4 days, the synthetic rubber is obtained as a latex-like emulsion from which the polymer may be obtained by coagulation. Before coagulation it is usually necessary to add an antioxidant or age-resister such as phenyl beta naphthylamine to improve the aging properties of the polymer. Coagulation may then be brought about by any of the methods ordinarily used to coagulate rubber latices such as by freezing out, by addition of acids, alcohol, or salts or by a combination of these methods.

The synthetic rubbers containing the diene hydrocarbon, acrylic nitrile and aryl olefin prepared in this manner are easily milled, may readily be mixed with pigments, fillers, softeners and vulcanization accelerators ordinarily used with natural rubber, and may be vulcanized in the usual manner.

The surprising improvement in properties of diene acrylic nitrile copolymers brought about by small amounts of an aryl olefin may further be illustrated by the following examples.

*Example 1.*—A mixture consisting of 25 parts of acrylonitrile, 73 parts of butadiene and 2 parts of styrene is emulsified with 250 parts of a 2% solution of palmitic acid which is 85% neutralized with alkali and 10 parts of a 3.5% solution of hydrogen peroxide. Polymerization is effected by agitation of the emulsion at 30° C. for 24½ hours, and the polymerization products are precipitated by the addition of salt and acetic acid, washed and dried. It is rather surprising that the time required for complete polymerization was in this case only 24½ hours, while using similar conditions but having no styrene present in the mixture required 40 hours for completion.

The copolymer obtained is more plastic and, on being milled, shows more tack and better dispersing qualities than a copolymer similarly prepared but containing no styrene. It also takes up pigments quite readily and, when compounded with channel black, stearic acid, zinc oxide, sulfur and accelerator and then vulcanized, a rubbery product of excellent properties is obtained. For instance, this vulcanizate in a typical tread stock possesses a tensile strength of 5000 lbs./sq. in. and an ultimate elongation of 720% as compared to a tensile strength of 4500 lbs./sq. in. and a 650% elongation exhibited by a similarly prepared, compounded, and vulcanized copolymer of 75% butadiene and 25% acrylonitrile. The oil resistance of the rubber is also improved, this material being swelled by mineral oil 22.3% by volume as compared to 25.2% for the polymer with no styrene.

*Example 2.*—A mixture of 25 parts acrylonitrile, 70 parts butadiene and 5 parts styrene are emulsified and polymerized as described in Example 1. The copolymer obtained is of desirable plasticity, may readily be extruded and easily takes up pigments. When compounded and vulcanized as in Example 1, the product exhibits a tensile strength of 4800 lbs./sq. in. and a 690% elongation. The oil resistance of the vulcanizate is also improved over that of the polymer described in Example 1.

*Example 3*

| | Parts |
|---|---|
| Butadiene | 75 |
| Acrylonitrile | 15 |
| Styrene | 10 | are polymerized in water emulsion as in Example 1. The material produced is thermoplastic and a hot mill may be used in its mastication. The polymer possess unusually good physical properties, its vulcanizate in a compound similar to that used in Example 1 exhibiting a tensile strength of 5100 lbs./sq. in. and 640% elongation.

*Example 4*

| | Parts |
|---|---|
| Butadiene | 50 |
| Acrylonitrile | 40 |
| Styrene | 10 | are polymerized as in Example 1 to an exceedingly tough cohesive copolymer which when vulcanized yields a very resistant material possessing a 5300 lbs./sq. in. tensile strength and a 520% elongation. The copolymer may also be milled and compounded without difficulty. A copolymer containing 50% butadiene, 50% acrylonitrile and no styrene is very difficult to process.

It may readily be seen from the foregoing examples that many unexpected advantages may be attained by including about 1 to 10% of styrene in a mixture of butadiene and acrylonitrile before polymerizing the monomer mixture to a synthetic rubber. Thus, the mechanical properties of the copolymer is increased, the oil resistance is enhanced, the processing properties are improved, and the employment of smaller proportions of butadiene is permitted by the practice of this invention.

It is also quite possible to use other dienes such as dimethyl butadiene in place of butadiene, methacrylonitrile or ethacrylonitrile instead of acrylonitrile and other aryl olefine such as vinyl naphthalene in place of styrene in the foregoing examples with similar results. Other polymerizing conditions, emulsifying agents and catalysts may also obviously be employed. It will be apparent to those skilled in the art that merely making these or similar substitutions does not depart from the spirit and scope of the invention as defined in the appended claims.

I claim:

1. The process which comprises polymerizing a mixture containing as the sole polymerizable constituents a diene hydrocarbon of the formula

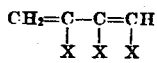

wherein X represents a member of the class consisting of hydrogen and methyl, an acrylic nitrile of the formula

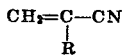

wherein R represents a member of the class consisting of hydrogen and alkyl and an aryl olefin of the formula

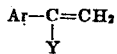

wherein Ar represents an aromatic hydrocarbon radical and Y represents a member of the class consisting of hydrogen and alkyl, said mixture containing more than 40% by weight of the diene hydrocarbon, from about 15 to 50% by weight of the acrylic nitrile and from about 1 to 10% by weight of the aryl olefin.

2. The process which comprises polymerizing in aqueous emulsion in the presence of an emulsifying agent a mixture containing as the sole polymerizable constituents a diene hydrocarbon of the formula

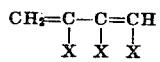

wherein X represents a member of the class consisting of hydrogen or methyl, an acrylic nitrile of the formula

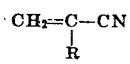

wherein R represents a member of the class consisting of hydrogen and alkyl and an aryl olefin of the formula

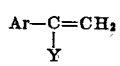

wherein Ar represents an aromatic hydrocarbon radical and Y represents a member of the class consisting of hydrogen and alkyl, said mixture containing more than 40% by weight of the diene hydrocarbon, from about 15 to 50% by weight of the acrylic nitrile and from about 1 to 10% by weight of the aryl olefin.

3. The process which comprises emulsifying with water in the presence of an emulsifying agent and a polymerization catalyst, a mixture containing as the sole polymerizable constituents a diene hydrocarbon of the formula

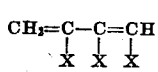

wherein X represents a member of the class consisting of hydrogen and methyl, an acrylic nitrile of the formula

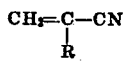

wherein R represents a member of the class consisting of hydrogen and alkyl and an aryl olefin of the formula

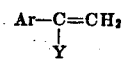

wherein Ar represents an aromatic hydrocarbon radical and Y represents a member of the class consisting of hydrogen and alkyl, said mixture containing more than 40% by weight of the diene hydrocarbon, from about 15 to 50% by weight of the acrylic nitrile and from about 1 to 10% by weight of the aryl olefin, and polymerizing the emulsion thus formed.

4. The process which comprises emulsifying with water in the presence of soap and a hydrogen peroxide catalyst, a mixture containing as the sole polymerizable constituents a diene hydrocarbon of the formula

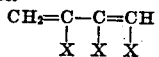

wherein X represents a member of the class consisting of hydrogen and methyl, an acrylic nitrile of the formula

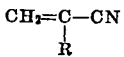

wherein R represents a member of the class consisting of hydrogen and alkyl and an aryl olefin of the formula

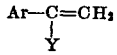

wherein Ar represents an aromatic hydrocarbon radical and Y represents a member of the class consisting of hydrogen and alkyl, said mixture containing more than 40% by weight of the diene hydrocarbon, from about 15 to 50% by weight of the acrylic nitrile and from about 1 to 10% by weight of the aryl olefin, and polymerizing the emulsion thus formed.

5. The process which comprises polymerizing a mixture containing as the sole polymerizable constituents butadiene, acrylonitrile, and styrene, said mixture containing more than 40% by weight of butadiene, from about 15 to 50% by weight of acrylonitrile and from about 1 to 10% by weight of styrene.

6. The process which comprises polymerizing a mixture containing as the sole polymerizable constituents butadiene, acrylonitrile and styrene, said mixture containing more than 40% by weight of butadiene, from about 15 to 50% by weight of acrylonitrile and from about 1 to 10% by weight of styrene, in the presence of water, an emulsifying agent and a polymerization catalyst.

7. The process which comprises polymerizing a mixture containing as the sole polymerizable constituents butadiene, acrylonitrile and styrene, said mixture containing more than 40% by weight of butadiene, from about 15 to 50% by weight of acrylonitrile and from about 1 to 10% by weight of styrene, in the presence of water, soap and a hydrogen peroxide catalyst.

8. The process which comprises polymerizing in aqueous emulsion a mixture consisting of about 70% by weight of butadiene, about 20% by weight of acrylonitrile and about 5% by weight of styrene.

9. The rubber-like products derived from the polymerization of a mixture containing as the sole polymerizable constituents a diene hydrocarbon of the formula $$CH_2=C-C=CH$$
$$\phantom{CH_2=}\overset{|}{X}\phantom{=}\overset{|}{X}\phantom{=}\overset{|}{X}$$

wherein X represents a member of the class consisting of hydrogen and methyl, an acrylic nitrile of the formula $$CH_2=C-CN$$
$$\phantom{CH_2=}\overset{|}{R}$$

wherein R represents a member of the class consisting of hydrogen and alkyl and an aryl olefin of the formula $$Ar-C=CH_2$$
$$\phantom{Ar-}\overset{|}{Y}$$

wherein Ar represents an aromatic hydrocarbon radical and Y represents a member of the class consisting of hydrogen and alkyl, said mixture containing more than 40% by weight of the diene hydrocarbon, from about 15 to 50% by weight of the acrylic nitrile and from about 1 to 10% by weight of the aryl olefin.

10. The rubber-like products derived from the polymerization of mixtures containing as the sole polymerizable constituents butadiene, acrylonitrile, and styrene, said mixtures containing more than 40% by weight of butadiene, from about 15 to 50% by weight of acrylonitrile and from about 1 to 10% by weight of styrene.

11. A rubber-like product obtained by the polymerization in aqueous emulsion of a mixture of about 70% by weight of butadiene, about 20% by weight of acrylonitrile and about 5% by weight of styrene.

CHARLES F. FRYLING.